United States Patent [19]
Brant et al.

[11] Patent Number: 5,517,613
[45] Date of Patent: May 14, 1996

[54] ENVIRONMENT SENSING/CONTROL CIRCUIT

[75] Inventors: William A. Brant; Gerald L. Hohenstein, both of Boulder, Colo.

[73] Assignee: EMC Corporation, Hopkinton, Mass.

[21] Appl. No.: 331,161

[22] Filed: Oct. 28, 1994

Related U.S. Application Data

[63] Continuation of Ser. No. 806,603, Dec. 12, 1991, abandoned.

[51] Int. Cl.⁶ .............................. G06F 11/00; G06F 17/50
[52] U.S. Cl. ............................................................. 395/180
[58] Field of Search .................................... 395/575, 500, 395/180; 365/505

[56] References Cited

U.S. PATENT DOCUMENTS 4,072,825  2/1978  McLay et al. ........................ 364/505
5,105,366  4/1992  Beckey ................................. 364/505

Primary Examiner—Robert W. Beausoliel, Jr.
Assistant Examiner—Norman M. Wright
Attorney, Agent, or Firm—John Land

[57] ABSTRACT

An environment sensing/control circuit for use in conjunction with an electronic subsystem. The invention is capable of sensing and controlling conditions of the environment of the subsystem. The invention is capable of being implemented as a stand-alone device or replicated numerous times in an integrated circuit. The invention identifies changes including intermittent changes, in the environment of the subsystem from a reference state, the reference state being dynamically determined by a processor. Upon detecting such a change, the invention signals the processor. The invention can also serve as a flexible interface for control signals from the processor to the subsystem.

36 Claims, 5 Drawing Sheets

ENVIRONMENT SENSING/CONTROL CIRCUIT

This is a continuation of application Ser. No. 07/806,603, filed on Dec. 12, 1991, now abandoned.

BACKGROUND OF THE INVENTION

1. Field of the Invention

This invention relates to an environment sensing/control circuit for an electronic subsystem, and more particularly, to a dual-mode circuit for controlling an electronic subsystem and for detecting intermittent errors in such a subsystem.

2. Description of Related Art

Modern electronic systems often comprise subsystems containing various components. Reliable operation of the subsystems is often essential to the operation of the systems in which they operate. For example, an on-line transaction processing (OLTP) computer system may include a data storage subsystem which must be highly reliable in order to minimize the possibility of data loss and system failure ("downtime"). In order to provide the most reliable operation for such subsystems, some systems are designed with processors which are capable of sensing and controlling the environment of the associated subsystems. In this way, the system has positive control over its environment, and can activate redundant or back-up systems if a failure occurs, or indicate the occurrence and location of faults for quick repair and recovery.

FIG. 1 shows a prior art system comprising an electronic subsystem 1, containing a variety of controllable elements, such as disk drives 2, power supplies 3, and fans 4, as well as a number of sensors, such as temperature sensors 5. Other sensors may be placed within the disk drives 2, power supply 3, and fans 4 for indicating the operational state of those components.

A plurality of analog signal lines 10 couple the sensors and controllable elements within the subsystem 1 to an analog controller 11, which contains suitable electronic elements (such as controllable switches to activate and deactivate controllable elements and digital-to-analog converters) for control purposes, and sensing circuits (such as analog-to-digital converters) necessary to process the signals transmitted on the signal lines 10. As shown in FIG. 1, some of the signal lines 10 comprise a single conductor (such as the control lines between each temperature sensor 5 and the analog controller 11), while others actually comprise two conductors, one to carry an activation signal from the analog controller 11 to a controllable element (such as the disk drive 2) and the other to carry a verification signal back to the analog controller 11 as an indication that the controllable element has properly responded to the activation signal.

The analog controller 11 is also configured to directly communicate with digital circuitry. Each control line and each sensing line coupled to the analog controller typically has a corresponding digital signal line 12. Typically, to actuate a controllable element within the subsystem 1, the corresponding digital signal line 12 is set to a logical state. The analog controller 11 provides an analog output in direct response to the logical state of each corresponding digital input. Similarly, the analog controller 11 provides a digital output corresponding to each analog input.

It is possible to couple the digital signal lines 12 directly to a central processing unit (CPU) 13, thereby permitting the CPU 13 to monitor the digital signal outputs of the analog controller 11, and provide digital signal inputs to the analog controller 11. However, to do so would require the CPU to constantly monitor the digital signal line 12. For many applications, this would constitute a waste of processor resources. Accordingly, it has been known to provide an environment sensing/control circuit 14 as an intermediate circuit between the CPU 13 and the analog controller 11. The purpose of the environment sensing/control circuit 14 is to latch control signals from the CPU 13, provide such latched signals as digital inputs to the analog controller 11, sense digital inputs from the analog controller 11, and provide an indication to the CPU 13 of changes in such conditions.

FIG. 2 is a schematic diagram of a prior art environmental sensing/control circuit. The circuit actually comprises two distinct sections, a control section and a sensing section. Both sections are coupled to the CPU 13 by a processor bus 21, which may be a standard bus. The major elements of both sections are individually addressable by the CPU 13 by supplying an address which is decoded (the decoder is not shown, but is conventional) such that individual "enable" lines would be coupled to each such major element. In addition, the major elements of both sections are coupled to data input and output lines on the bus 21 for communication with the CPU 13.

In FIG. 2, the control section comprises a control memory register 22, which may be simply a D-type flip-flop. When the control memory register 22 is addressed by the CPU 13, the CPU 13 can provide a logical "0" or a logical "1" on the bus 21 as the input to the control memory register 22 to be "latched" within the control memory register 22. The output of the control memory register 22 is provided on a control output connection 23, which would be directly coupled over a digital input signal line 12 to the analog controller 11.

For reliability purposes, the control memory register 22 is provided with an addressable driver 22' which permits the output of the control memory register 22 to be coupled back onto the bus 21 so that the CPU 13 can verify that its input to the control memory register 22 was, in fact, latched. This capability is referred to in the art as "read after write" verification.

In use, the CPU 13 would address the control memory register 22 and set a logical "0" or logical "1" into the control memory register 22. If desired, the CPU 13 would then read the output of the control memory register 22 by means of the associated driver 22'. The output of the control memory register 22 is coupled by output connection 23 to the analog controller. For example, if the CPU 13 commanded that a disk drive 2 within the subsystem 1 be powered up, the control section of an environment sensing/control circuit 14 corresponding to the selected disk drive 2 would be addressed by the CPU 13, and the logical value corresponding to "power-up" (e.g., logical "1") would be stored in the corresponding control memory register 22. The output of the control memory register 22 would be converted by the analog controller 11 to a suitable signal to cause power to be provided to the selected disk drive 2.

The sensing section shown in FIG. 2 is somewhat more complex than the control section. Digital condition signals from the analog controller 11 are provided as an input to the sensing section via an environmental condition input connection 24, which is coupled to a sensing driver 25. The CPU 13 can directly monitor the condition signal on connection 24 by selecting an addressable direct input driver 25.

The digital condition signal on input connection 24 is also provided to a two-input exclusive-OR (XOR) gate 26, which functions as a comparator. The other input of the XOR gate 26 is provided by a reference memory register 27, which again may be a D-type flip-flop. The reference memory register 27 has an associated driver 27', to provide a "read after write" verification capability. The input to the reference memory register 27 is provided by the CPU 13. The reference memory register 27 latches its input and provides that value as an input to the XOR gate 26. The output of the XOR gate 26 is coupled to a tri-statable driver 28, which is coupled to the processor bus 21.

In operation, the CPU 13 sets a value in reference memory register 27, the output of which is constantly compared with the condition signal on input connection 24. This configuration permits the CPU 13 to set a reference value in the reference memory register 27, and detect any changes or "exceptions" of the condition signal on input connection 24 from that reference value. For example, if the condition signal on input connection 24 represents a temperature state as monitored by the analog controller 11, and has a value of "0" when the temperature is within normal operating limits and a value of "1" when a corresponding temperature sensor 5 within the subsystem 1 detects an out-of-limit condition, the CPU 13 might latch a logical "0" into the reference memory register 27. The output of the XOR gate 26 would, therefore normally be a "0" when the condition signal on input 24 is also a "0" (indicating normal temperature), and would change to a logical "1" if the condition signal on input connection 24 differs in value from the reference signal stored in reference memory register 27. If, on the other hand, the condition being monitored was "valid voltage level present" in a disk drive 2, the normal condition might be a logical "1" and failure would be a logical "0." In this case, a "1" would be latched into the reference memory register 27.

It should be clear from the description above that every control line to the analog controller 11 and every sensing line from the analog controller 11 requires a dedicated control section or sensing section of the type shown in FIG. 2. Thus, for a plurality of digital signal lines 12, a plurality of circuits of the type shown in FIG. 2 would be required. It is possible for the CPU 13 to be configured so as to poll all of the control and sensing sections of a plurality of environment sensing/control circuits. However, it is known to instead use an interrupt technique to provide a single signal to the CPU 13 to indicate that the CPU 13 needs to determine which of a plurality of environment sensing/control circuits has detected an "exception" to a reference signal. Therefore, a "global" OR gate 29 is provided, coupled to the output of each sensing section XOR gate 26 for the plurality of environmental sensing/control circuits. Thus, whenever any of the sensing sections indicates an exception from a reference state, an interrupt request (IRQ) signal is provided by OR gate 29 to the CPU 13. The CPU 13 may then invoke an interrupt routine designed to address each environmental sensing/control circuit individually to detect which XOR gate 26 indicates an exception to a reference state.

A number of problems exist with the prior art environment sensing/control circuits. A principal problem is that the CPU 13 may not respond to an IRQ signal in a sufficiently timely manner to check all of the individual sensing sections of the environment sensing/control circuits before the condition which caused the interrupt signal to become active returns to its "non-exception" state. This is problematic for at least three reasons. The first is that time can be wasted checking each sensing section to determine which caused the interrupt; processing resources are therefore wasted. The second reason is that an intermittent condition which should have been identified can go undetected, thereby reducing the reliability of the subsystem 1 as a whole. The third reason is that interruptions of the CPU 13 in response to intermittent signals can interfere with other operations which the CPU 13 must perform.

Another problem that can occur with the prior art is that once an exception condition exists within the sensing section of an environment sensing/control circuit, the CPU 13 has no means for controllably deactivating the sensing section. Under certain conditions, the CPU 13 may wish to ignore some exception conditions, while still retaining the ability to monitor other exception conditions. The prior art environment sensing/control circuits provide no means for accomplishing this function.

Yet another problem which exists in the prior art is that the input logic convention of the analog controllers 11 is sometimes not consistent. Some analog controllers require a low voltage level input to indicate a logical "1", while other analog controllers require a high voltage level input to indicate a logical "1." This lack of uniformity makes it more difficult for a programmer to use a uniform polarity convention when writing program code which instructs the CPU 13. A similar problem exists with respect to digital output signals from an analog controller 11.

A further problem of the prior art is that the control section and sensing section of the environment sensing/control circuit each require a dedicated signal line. When implementing such a circuit in an integrated circuit, it may be difficult to predict in advance how many control sections and how many sensing sections are required for a particular application. In addition, economics dictate that an integrated circuit have as few signal pins as possible. Therefore, the prior art is not flexible in providing a good match between the number of control sections and the number of sensing sections required for a variety of applications, while minimizing the number of pins in an integrated circuit implementation.

Therefore, it is desirable to provide an environment sensing/control circuit which has means for (1) detecting intermittent error conditions in order to allow a processor to detect which condition among many has caused an exception, (2) selectively and dynamically permitting control of the input and output polarity convention of the circuit, (3) selectively preventing changes in the environmental conditions from generating an interrupt signal, and (4) providing maximum flexibility in configuring control and sensing sections, while minimizing the number of signal lines or pins required for the circuit.

The present invention provides such an environment sensing/control circuit.

SUMMARY OF THE INVENTION

The present invention is capable of sensing and controlling the condition of the environment of an electronic subsystem. Furthermore, the invention is capable of being implemented as a stand-alone device or being replicated numerous times in an integrated circuit (IC).

A typical system in which the invention is used comprises a plurality of electronic subsystems, a central processing unit (CPU) which controls and monitors the electronic subsystems, an analog controller, and the inventive environment sensing/control circuit.

The invention identifies changes in digital condition signals, representing the environment of an electronic subsystem, from a reference state. The reference state can be dynamically set by the CPU. Additionally, the invention when replicated, can monitor several conditions simultaneously. Further, the invention can record and indicate which conditions being monitored, including conditions which are intermittent, have changed. Upon detecting a change, the invention signals the CPU that the change has occurred. The invention also serves as a programmable interface for control signals from the CPU to the analog controller.

The invention permits very inexpensive and flexible environment sensing and control to be achieved, due to the ease with which it can be reconfigured and inexpensively replicated in an IC.

In the preferred embodiment of the invention, memory registers are provided for storing reference states set by the CPU. Additional memory registers are provided for storing flags which indicate that the state of a particular condition being monitored in the subsystem is different from the reference state. One flag is provided for each condition that is being monitored. By setting a flag in a memory register, a change from the reference state by the condition being monitored can be detected by the CPU at a later time. In this way, a change can be detected even if the monitored condition returns to the reference state before the CPU has had an opportunity to identify which particular condition changed.

The preferred embodiment of the invention also incorporates a memory register which may be externally and dynamically programmed to determine whether changes in a particular environmental condition are to be reported to the CPU. This is accomplished by suppressing the output of a comparator that detects when the condition is different from the reference. However, even upon selecting to suppress the comparator output, changes in the condition are nonetheless recorded by the invention and may be made available to the CPU at a later time.

Additionally, the preferred embodiment has all the necessary circuitry to either sense changes in the environment of a subsystem or send control signals to the subsystem. The determination as to whether the invention is used to sense or control the environment is made by a command to the invention from the CPU. In the preferred embodiment, a single port is used for both the sensing function and the controlling function. The invention may, however, be configured to provide a separate port for each function. When so configured, sensing and controlling can be done simultaneously by the same circuit.

When programmed to operate in a "control mode" of operation, the invention accepts inputs from a CPU. These inputs are stored in a register and then applied to a subsystem for the purpose of causing some change in the condition of the subsystem in response to information received by the CPU.

Whether the invention utilizes the conventions of positive or negative logic for I/O signals in either a "sense mode" or the control mode can be programmed by an input applied to the invention. When positive logic is selected, a logical "1" state is indicative of an active condition and a logical "0" is indicative of an inactive condition. When negative logic is selected, a logical "0" state is indicative of an active condition and a logical "1" is indicative of an inactive condition.

An additional feature of the preferred embodiment is that all memory registers which are programmable by the CPU can be read back by the CPU. This allows positive confirmation that information has been properly written to each memory register.

Further aspects of the present invention will become apparent from the following detailed description when considered in conjunction with the accompanying drawings. It should be understood, however, that the detailed description and the specific examples, while representing the preferred embodiment of the invention, are given by way of illustration only.

BRIEF DESCRIPTION OF THE DRAWINGS

Like reference numbers in the various drawings refer to like elements.

DETAILED DESCRIPTION OF THE INVENTION

The following description is of the best presently contemplated modes of carrying out the invention. This description is made for the purpose of illustrating the general principles of the invention and should not be taken in a limiting sense.

Figure 1:
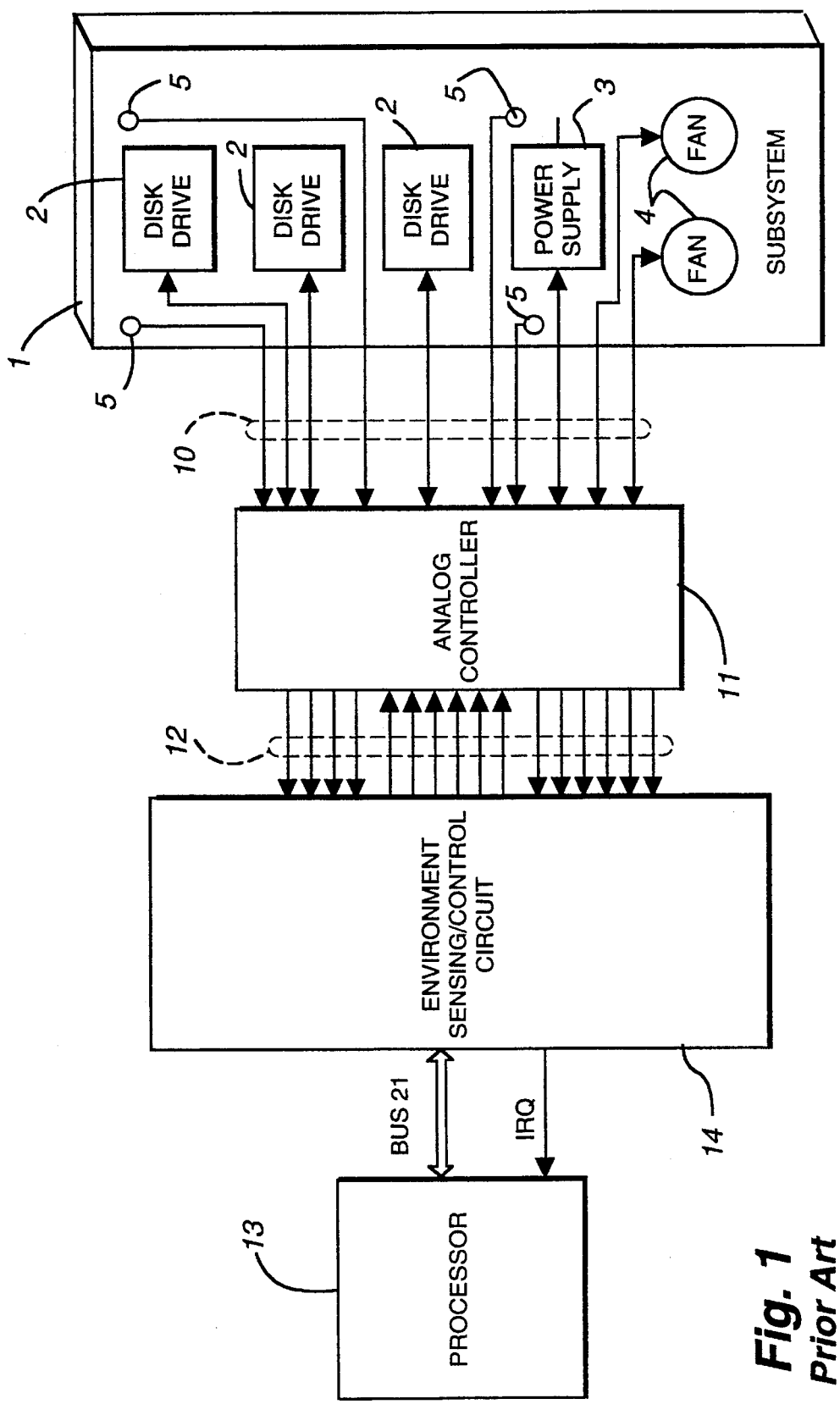
FIG. 1 is a block diagram of a prior art environment sensing/control circuit used with a processor and electronic subsystem.

The inventive environment sensing/control circuit accepts the same inputs and outputs as the environment sensing/control circuits which are presently known in the prior art. In this way, the invention can be retro-fitted into existing systems. Therefore, FIG. 1 will be referenced when the following discussion refers to the components of the system external to the invention.

Figure 2:
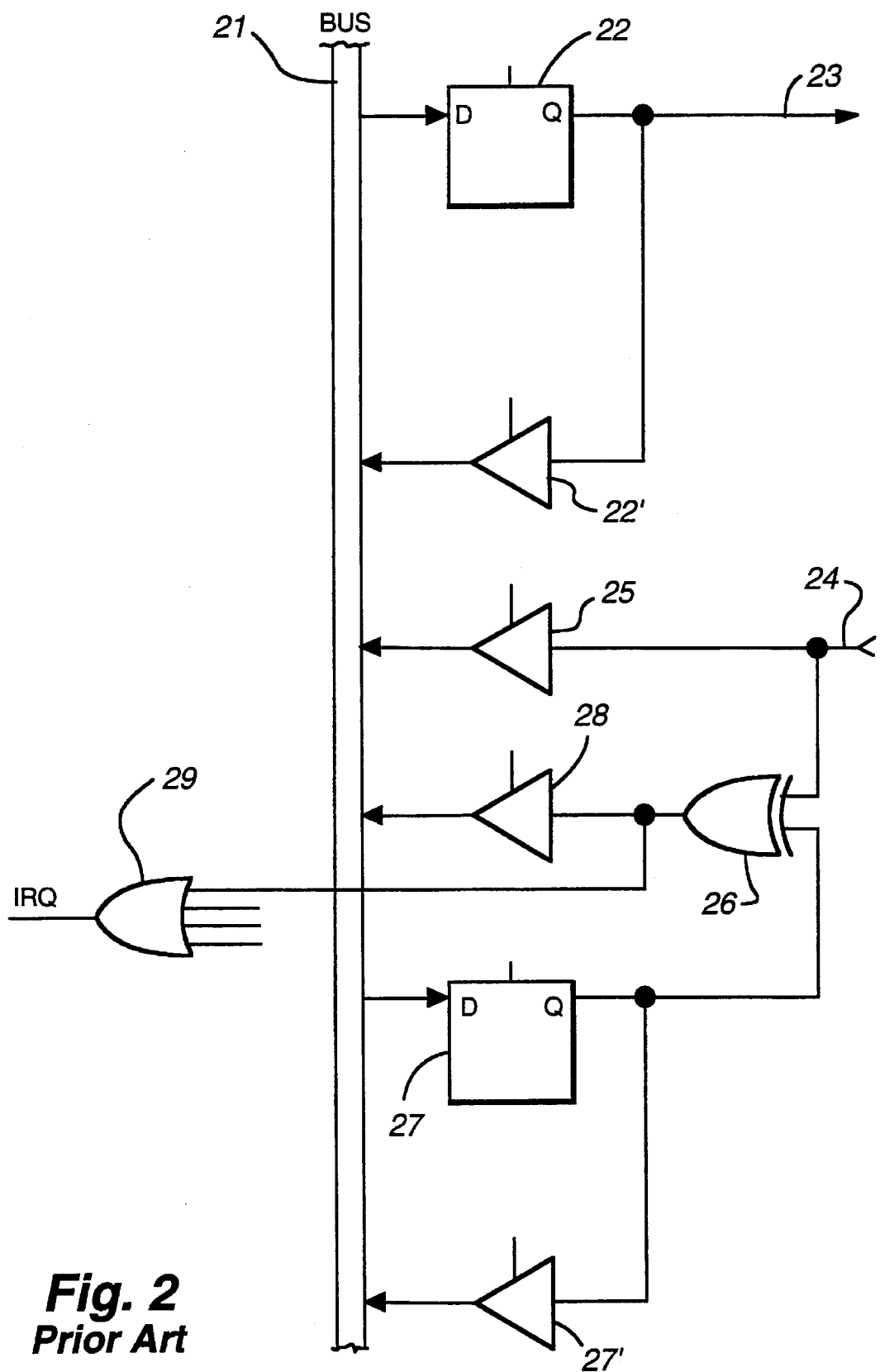
FIG. 2 is a detailed schematic of a prior art environment sensing/control circuit.
Figure 3:
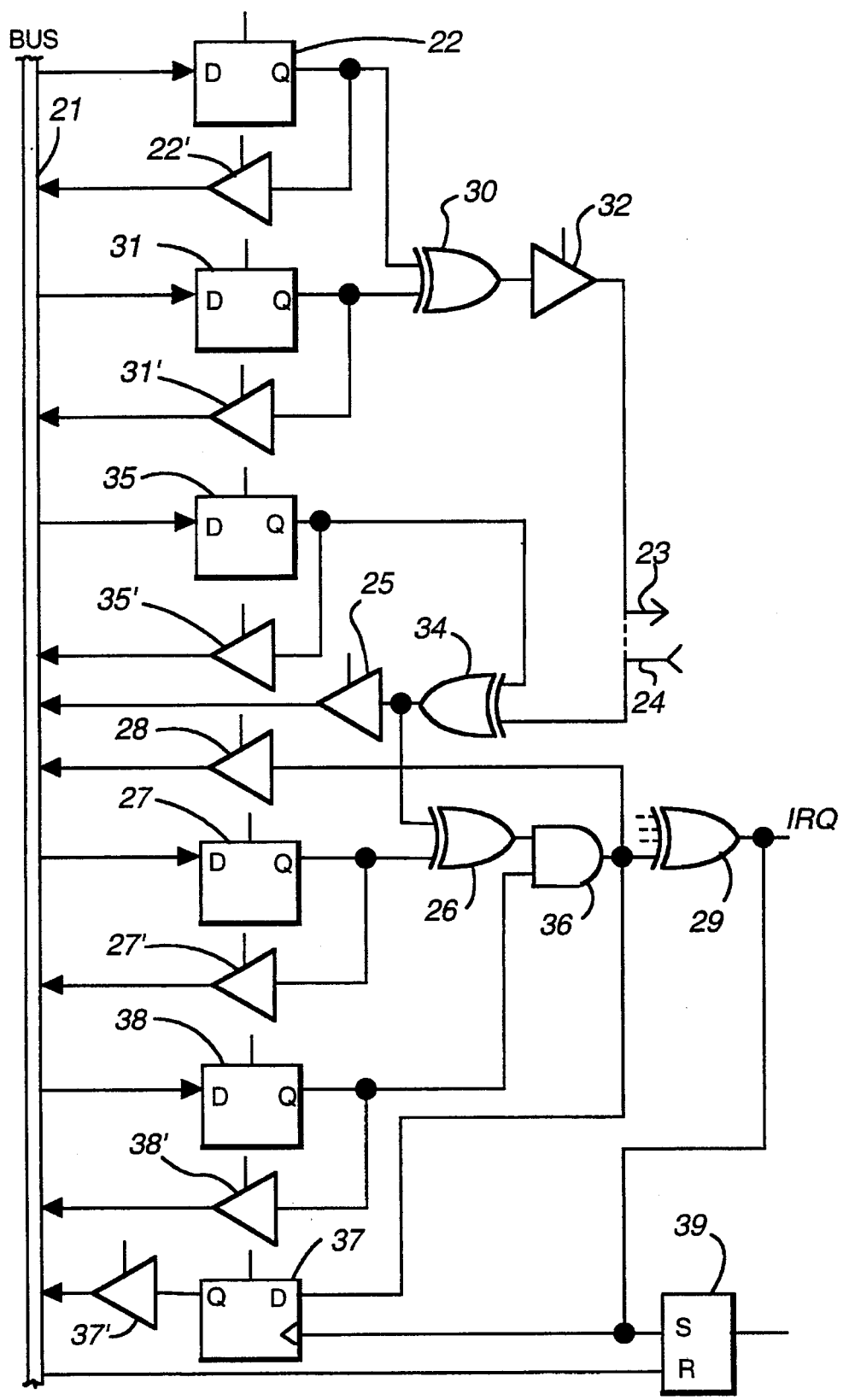
FIG. 3 is a detailed schematic diagram of the inventive environment sensing/control circuit.

FIG. 3 is a detailed schematic of the inventive environment sensing/control circuit. The invention is divided into two distinct sections, a control section and a sensing section. Both sections are coupled to a CPU 13 (refer to FIG. 1) by a processor bus 21, which may be a standard bus similar to the bus 21 shown in FIG. 2 described above. In the preferred embodiment, the invention is fabricated in an integrated circuit (IC). However, it is equally acceptable to have the circuit built from discrete components.

The control section comprises a control memory register 22 and an associated addressable driver 22', which are connected and which operate in a manner similar to the corresponding elements shown in FIG. 2 described above. The control section further comprises an output exclusive-OR (XOR) gate 30, an output polarity memory register 31, an associated addressable driver 31', and an addressable output driver 32. The outputs of the control memory register 22 and the output polarity memory register 31 are coupled to the output XOR gate 30 as shown in FIG. 3.

The input to the output polarity memory register 31 is coupled to the processor bus 21 and can be "latched" when addressed by the CPU 13 by a procedure similar to the procedure implemented to latch data into the control memory register 22 of FIG. 2. The associated addressable driver 31' allows the CPU 13 to perform "read after write" verification.

The output polarity memory register 31, in conjunction with the output XOR gate 30, creates a programmable inversion means which operates to cause the output of the control memory register 22 to be inverted when the output of the output polarity memory register 31 is a logical "1." The output of the control memory register 22 passes through the output XOR gate 30 unaltered when a logical "0" is latched into the output polarity memory register 31. In this way, a control signal from the CPU 13 which is latched into the control memory register 22 can be selectively inverted by a command to the invention which is latched into the output polarity memory register 31. This capability allows standard software modules to be encoded which will be applicable to any analog controller 11 or any controllable element of a subsystem which is coupled to the invention, regardless of the polarity convention of the coupled device.

The output driver 32 coupled to the output XOR gate 30 allows the control section of the invention to be buffered from a control output connection 23. By buffering the control section from the output connection 23, both the sensing section (described below) and the control section of the invention may share the same port or pin.

The sensing section includes an input section that comprises a direct input driver 25, an exception XOR gate 26, a reference memory register 27, an associated driver 27', an addressable exception state driver 28, and an interrupt OR gate 29 connected as shown in FIG. 3. These components of FIG. 3 perform functions similar to the functions performed by the corresponding components shown in FIG. 2 and described above. Thus, the reference memory register 27 latches data provided by the CPU 13 via the bus 21 when the reference memory register 27 is properly addressed. The data so provided determines a reference value to be compared against a condition signal provided to the invention at an environmental condition input connection 24 from an analog controller 11 (refer to FIG. 1). The comparison is provided by the exception XOR gate 26, the output of which is coupled (through an AND gate 36, described below) to the exception state driver 28, which in turn is coupled to the bus 21. The output of the exception XOR gate 26 is coupled to the interrupt OR gate 29, which provides an interrupt request (IRQ) signal to the CPU 13 upon the occurrence of a exception condition.

Additionally, an input XOR gate 34 is present in the invention, and is coupled to the direct input driver 25 as shown in FIG. 3. The input XOR gate 34 is coupled to the output from an input polarity memory register 35, and to the input connection 24. The input polarity memory register 35, like the output polarity memory register 31, latches data from the bus 21 when properly addressed. An associated driver 35' provides a "read after write" verification capability. When a logic "1" is latched into the input polarity memory register 35, the input signal provided to the invention by the analog controller 11 at input connection 24 is inverted by the input XOR gate 34. When a logic "0" is latched into the input polarity memory register 35, the input condition signal passes through the input XOR gate 34 unaltered. The input polarity memory register 35 thus provides the capability to adapt the invention to analog controllers which utilize either a negative or positive logic convention.

As shown in FIG. 3, a programmable switching means is provided by the two-input AND gate 36 and an interrupt (IRQ) disable memory register 38. The AND gate 36 allows the output of the exception XOR gate 26 to be provided to the input of the exception state driver 28, the input of the interrupt OR gate 29, and to the input of an IRQ memory register 37, whenever the second input to the AND gate 36 is at a logic "1" state. The second input to the AND gate 36 is coupled to the IRQ disable memory register 38, the input of which is coupled to the processor bus 21. An associated driver 38' provides "read after write" verification capability.

The inclusion of this circuit in the invention allows the CPU 13 to prevent unwanted IRQ signals from distracting the CPU 13 from executing more essential routines, and permits the CPU 13 to detect subsequent interrupts which are channeled through the same interrupt OR gate 29 by other environment sensing/control circuits. It is particularly important that the CPU 13 have the ability to disable inputs to the interrupt OR gate 29 after they have been acknowledged. Otherwise, if a condition that caused an exception signal input to the interrupt OR gate 29 persists after the CPU 13 has acknowledged the existence of the condition, subsequent changes detected by any other environment sensing/control circuits will go undetected by the CPU 13.

As noted above, the exception state driver 28 provides a signal to the CPU 13 which indicates the result of the comparison between the reference value in reference memory register 27 and a condition signal from the input connection 24. In response to the IRQ signal generated as a result of an exception condition, the CPU 13 can poll the environment sensing/control circuits and determine the current state of the condition as indicated by either the exception signal, which is made available to the processor by addressing the exception state driver 28 or the condition signal, which is made available to the processor by addressing the direct input driver 25. However, this ability to monitor an input condition signal for an exception does not reliably detect intermittent changes to a condition signal. Therefore, also made available to the CPU 13 is the exception signal value latched into the IRQ memory register 37, the output of which is coupled to the bus 21. The IRQ memory register 37 latches the output of the AND gate 36 upon a transition from a logic "0" to a logic "1" of the output from the interrupt OR gate 29. By latching the exception signal which is output by the AND gate 36, the CPU 13 can identify which condition signal has deviated from the reference value against which the condition signal is compared, even when the condition signal returns to its original state before the CPU 13 has had an opportunity to address each environment sensing/control circuit to determine which one caused the IRQ signal to the CPU 13.

Additionally, the output of the interrupt OR gate 29 is coupled to a Set/Reset (S/R) flip-flop 39, which captures any transition from a logic "0" to a logic "1" by the output of the interrupt OR gate 29. This gives the CPU 13 a single latched indication that at least one exception condition has occurred. The reset input to the (S/R) flip-flop 39 is coupled to the Bus 21 and is under the control of the CPU 13. In this way the CPU 13 may reset the S/R flip-flop 39 upon acknowledging a set condition. Alternatively, the S/R flip-flop can be reset automatically after the CPU 13 reads the IRQ status, by connecting the reset input of S/R flip-flop 39 to the address line (not shown) associated with the IRQ memory register 37. Also, as in FIG. 2, the direct input driver 25 of FIG. 3 provides direct information regarding the status of the environmental condition to the CPU 13 via the bus 21.

Thus, the preferred embodiment of the invention, as described above, provides an environment sensing/control circuit which has means for detecting intermittent exception conditions in order to allow a processor to detect which condition signal, among many, has caused an exception signal to be created. The environment sensing/control circuit also has means for selectively and dynamically permitting control of the input and output polarity convention of the circuit, and selectively preventing changes in the environmental conditions from generating an interrupt signal.

Figure 4:
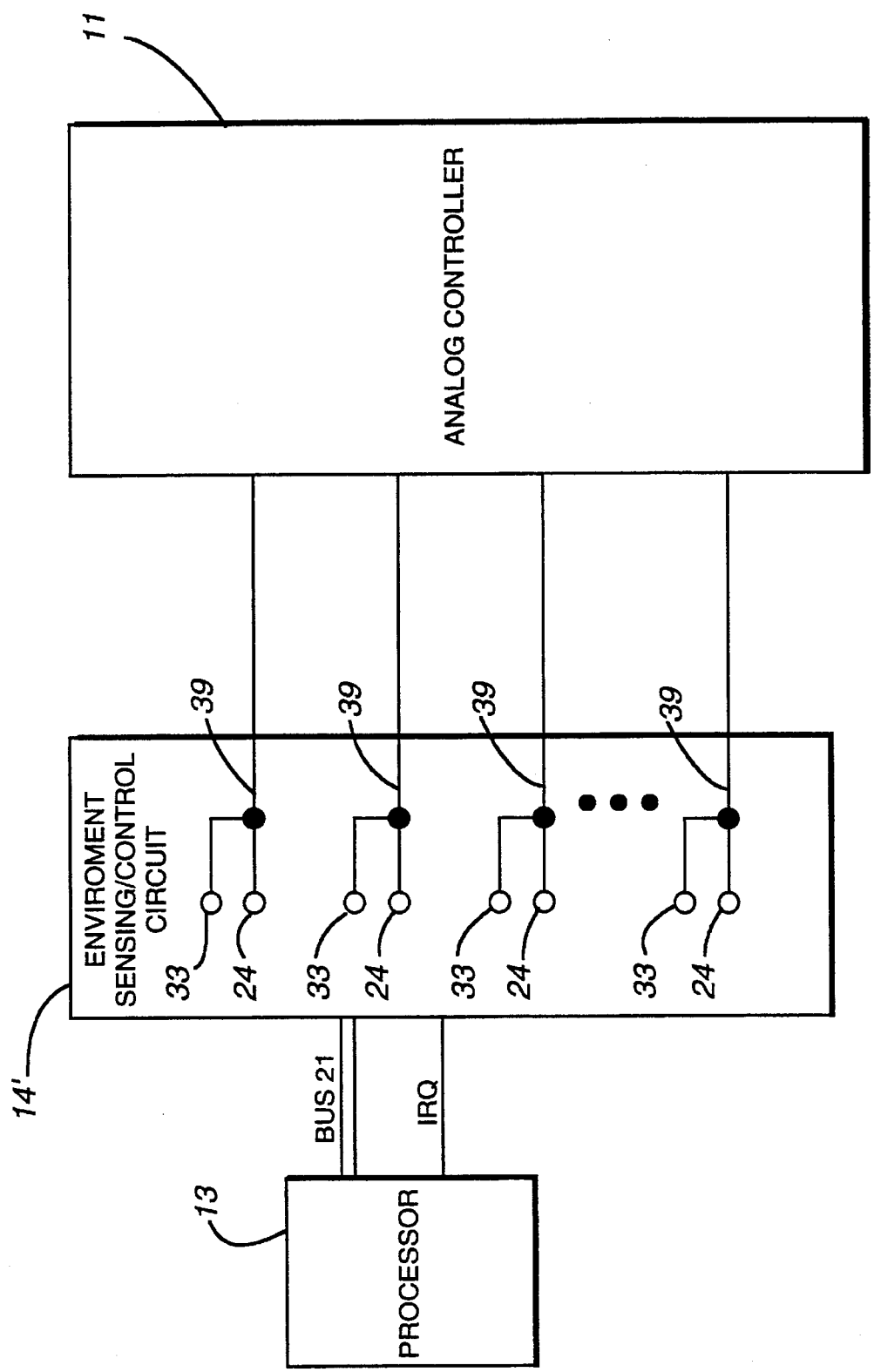
FIG. 4 is a block diagram of the invention having a single output connection.

In addition, the circuit shown in FIG. 3 can be implemented such that a single input/output (I/O) pin is used. In such an embodiment, input connection 24 and output connection 23 are "wired" together (as indicated by the dotted line in FIG. 3) and a single I/O pin 39 as shown in FIG. 4 is used to interface the sensing/control circuit 14' to the analog controller 11. When the circuit is in a "control mode," the output driver 32 is enabled, permitting the output of the control memory register 22 to determine the signal level that appears on the single I/O pin 39. When the circuit is used in a "sense mode," the output driver 32 is disabled (i.e., placed into high impedance mode), and the I/O pin 39 is used to conduct signals from the analog controller 11 to the sensing section of the circuit 14'. Because the I/O pin 39 can be used as either an input connection or an output connection, the sensing/control circuit can be replicated numerous times in an integrated circuit, and the determination as to whether the integrated circuit that forms a complete sensing/control circuit is used in a control mode or a sensing mode can be made under processor control. In this way, the number of pins dedicated to output control purposes and the number of pins dedicated to input sensing purposes can be dynamically configured for each particular application. Alternatively, as shown in FIG. 3, the circuit can be implemented with an independent output connection 23 and an independent input connection 24.

Figure 5:
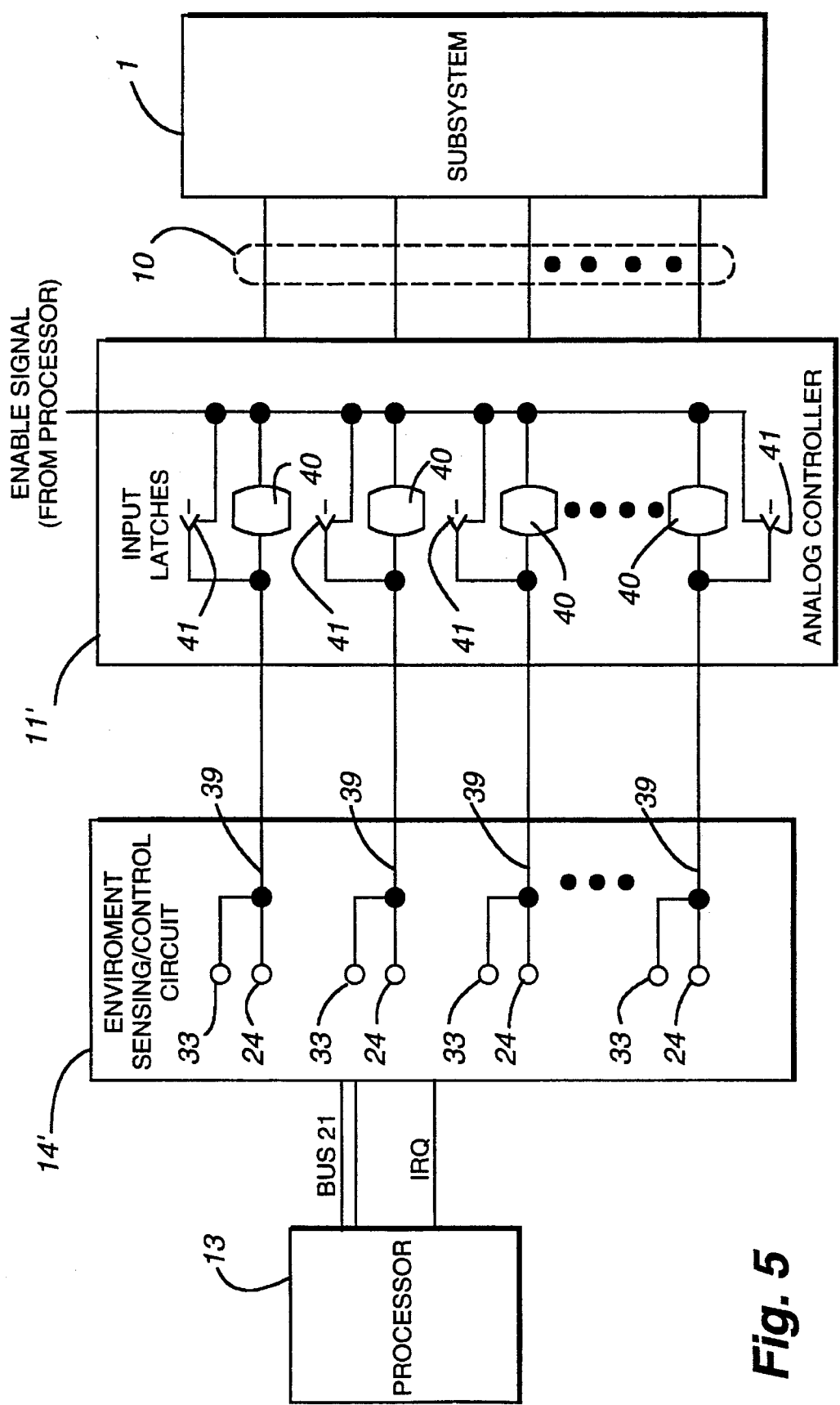
FIG. 5 is a block diagram of the invention as used with an analog controller having latched control inputs.

In an alternative embodiment of the invention, shown in FIG. 5, the inventive environment sensing/control circuit 14' is used in conjunction with an analog controller 11' that has latchable inputs. That is, the analog controller 11' has an Enable input which, when activated, permits data to be stored into input memory registers (such as latches 40) of the analog controller 11' while disabling the digital outputs (e.g., by means of tri-statable drivers 41) of the analog circuit 11'. Thus, by coupling the I/O pin 39 to both an input circuit and an output circuit of the analog controller 11', it is possible to use a single I/O pin in conjunction with the inventive circuit and still utilize both the control section and the sensing section of each circuit. Normally, each environment sensing/control circuit would be in the sense mode (i.e., the output driver 32 of the circuit is disabled). Each digital input to the analog controller 11' would also normally be disabled.

When in the control mode, the Enable input to the analog controller 11' would be activated, thereby disabling digital output drivers 41 in the analog controller 11', and latching into the input latches 40 of the analog controller 11' the corresponding signal from a coupled control section of an environment sensing/control circuit 14'. In the environment sensing/control circuit 14', each output driver 32 would be enabled, thereby permitting the contents of the control memory register 22 to be coupled through its I/O pin 39 to an input of the analog controller 11'. As shown in FIG. 5, all of the latchable inputs to the analog controller 11' would be programmed at the same time. When the Enable input to the analog controller 11' is inactive, the digital output signals of the analog controller 11' are again enabled, thereby providing input signals to the sensing section of corresponding environment sensing/control circuits. This configuration thus permits the inventive environment sensing/control circuit to be used in both the control mode and the sense mode over a single I/O pin.

It will be understood that various modifications may be made without departing from the spirit and scope of the invention. For example, the memory registers, which are shown in the above description as being implemented by flip-flops, could be implemented by memory locations within a larger addressable integrated circuit memory array, such as a "first in, first out" (FIFO) memory register in place of the flip-flop 37 shown in FIG. 3. Use of a FIFO would allow environmental changes to be recorded between the time of the first occurrence of an exception condition and the time the memory is read. Further, the invention could be used to control and sense environmental conditions for a large variety of subsystems within a larger system of which the invention is a part, and is not limited to the specific example of fans, power supplies, and disk drive units within a disk drive subsystem. Accordingly, it is to be understood that the invention is not to be limited by the specific illustrated embodiment, but only by the scope of the appended claims.

We claim:

1. An environment sensing/control circuit for detecting changes in the environment of an electronic subsystem and transmitting indications of changes to a processor, the environment sensing/control circuit comprising:

a. an interrupt memory, dedicated to an environmental condition in which changes are to be detected, for storing a flag indicative of detected changes in the environmental condition, the contents of the interrupt memory being accessible to the processor; and b. an output buffer means coupled to the output of the interrupt memory for providing access to the contents of the interrupt memory by the processor while electrically isolating the output of the interrupt memory from the processor to prevent disturbances or overloading from occurring on the output of the interrupt memory.

2. An environment sensing/control circuit for detecting changes in the environment of an electronic subsystem and transmitting indications of changes to a processor, the environment sensing control circuit comprising:

a. an interrupt memory, dedicated to an environmental condition in which changes are to be detected, for storing a flag indicative of detected changes in the environmental condition, the contents of the interrupt memory being accessible to the processor;

b. a reference memory for storing a reference state, the reference state being programmed by the processor;

c. a difference detector for creating an exception signal when a difference exists between the contents of the reference memory and the environmental condition; and d. an output buffer means coupled to the output of the reference memory for providing access to the contents of the reference memory by the processor while electrically isolating the output of the reference memory from the processor to prevent disturbances or overloading from occurring on the output of the reference memory.

3. An environment sensing/control circuit for detecting changes in the environment of an electronic subsystem and transmitting indications of changes to a processor, the environment sensing/control circuit comprising:

a. an interrupt memory, dedicated to an environmental condition in which changes are to be detected, for storing a flag indicative of detected changes in the environmental condition, the contents of the interrupt memory being accessible to the processor;

b. a reference memory for storing a reference state, the reference state being programmed by the processor;

c. a difference detector for creating an exception signal when a difference exists between the contents of the reference memory and the environmental condition; and d. a programmable switching means for preventing the difference detector from making a created exception signal accessible to the processor and from storing the created exception signal in the interrupt memory.

4. The environment sensing/control circuit of claim 3, further comprising an interrupt disable memory means for storing a signal determinative of whether the programmable switching means will prevent the difference detecting means from making accessible to the processor, a created exception signal and from storing the exception signal in the interrupt memory.

5. The environment sensing/control circuit of claim 4, further comprising an output buffer means coupled to the output of the interrupt disable memory means for providing access to the contents of the interrupt disable memory means by the processor while electrically isolating the output of the interrupt disable memory means from the processor to prevent disturbances or overloading from occurring on the output of the interrupt disable memory means.

6. An environment sensing/control circuit for detecting changes in the environment of an electronic subsystem and transmitting indications of changes to a processor, the environment sensing/control circuit comprising:

a. an interrupt memory, dedicated to an environmental condition in which changes are to be detected, for storing a flag indicative of detected changes in the environmental condition, the contents of the interrupt memory being accessible to the processor;

b. summing means for creating an interrupt signal, the interrupt signal indicating that any one or more of a plurality of environmental conditions has changed;

c. a reference memory for storing a reference state, the reference state being programmed by the processor; and d. a difference detector for creating an exception signal when a difference exists between the contents of the reference memory and the environmental condition;

wherein the output of the summing means is applied to the interrupt memory for determining when the interrupt memory is to store the exception signal created by the difference detector.

7. An environment sensing/control circuit for detecting changes in the environment of an electronic subsystem and transmitting indications of changes to a processor, the environment sensing/control circuit comprising:

a. an interrupt memory, dedicated to an environmental condition in which changes are to be detected, for storing a flag indicative of detected changes in the environmental condition, the contents of the interrupt memory being accessible to the processor; and b. a programmable inversion means for selectively inverting the signal representing the environmental condition, the programmable inversion means being coupled to an environmental condition interrupt connection of the environment sensing/control circuit.

8. The environment sensing/control circuit of claim 7, further comprising an input polarity memory means for storing a signal which is determinative of whether the programmable inversion means will invert the signal representing the environmental condition, the input polarity memory means being coupled to the input of the programmable inversion means.

9. The environment sensing/control circuit of claim 8, further comprising an output buffer means coupled to the output of the input polarity memory means for providing access to the contents of the input polarity memory means by the processor while electrically isolating the output of the input polarity memory means from the processor to prevent disturbances or over-loading from occurring on the output of the input polarity memory means.

10. An environment sensing/control circuit for receiving a first signal from a processor and transmitting the signal to a subsystem, the environment sensing/control circuit comprising:

a. a programmable inversion means for inverting the first signal prior to transmission of the first signal to the subsystem;

b. a control memory means for storing the first signal transmitted from the processor; and c. an output polarity memory means for storing a second signal received by the environment sensing/control circuit from the processor, the second signal being determinative of whether the programmable inversion means will invert the first signal received by the environment sensing/control circuit from the processor.

11. The environment sensing/control circuit of claim 10, further comprising:

a. a first output buffer means coupled to the output of the control memory means for providing access to the contents of the control memory means by the processor while electrically isolating the output of the control memory means from the processor to prevent disturbances or overloading from occurring on the output of the control memory means; and b. a second output buffer means coupled to the output of the output polarity memory means for providing to the processor, access to the contents of the output polarity memory means, while electrically isolating the output of the output polarity memory means from the processor to prevent disturbances or overloading from occurring on the output of the output polarity memory means.

12. The environment sensing/control circuit of claim 10, further comprising an output buffer with adjustable output impedance, the output of the buffer being coupled to a control output connection of the environment sensing/control circuit for selectively increasing and decreasing the output impedance at the control output connection of the environment sensing/control circuit.

13. An environment sensing/control circuit for detecting changes in the environment of an electronic subsystem and transmitting indications of the changes to a processor when used in a sensing mode and for receiving a signal from a processor and transmitting the signal to a subsystem when used in a control mode, the environment/sensing circuit comprising:

a. an interrupt memory, dedicated to an environmental condition in which changes are to be detected, for storing a flag indicative of detected changes in the environmental condition, the contents of the interrupt memory being accessible to the processor;

b. a programmable inverter for inverting the signal prior to transmission of the signal to the subsystem; and c. an output buffer coupled to the output of the interrupt memory for providing access to the contents of the interrupt memory by the processor while electrically isolating the output of the interrupt memory from the processor to prevent disturbances or overloading from occurring on the output of the interrupt memory.

14. An environment sensing/control circuit for detecting changes in the environment of an electronic subsystem and transmitting indications of the changes to a processor when used in a sensing mode and for receiving a signal from a processor and transmitting the signal to a subsystem when used in a control mode, the environment/sensing circuit comprising:
  a. an interrupt memory, dedicated to an environmental condition in which changes are to be detected, for storing a flag indicative of detected changes in the environmental condition, the contents of the interrupt memory being accessible to the processor;
  b. a programmable inverter for inverting the signal prior to transmission of the signal to the subsystem;
  c. a reference memory for storing a reference state, the reference state being programmed by the processor;
  d. a difference detector for creating an exception signal when a difference exists between the contents of the reference memory and the environmental condition; and
  e. an output buffer, coupled to the output of the reference memory, for providing access to the contents of the reference memory by the processor while electrically isolating the output of the reference memory from the processor to prevent disturbances or overloading from occurring on the output of the reference memory.

15. An environment sensing/control circuit for detecting changes in the environment of an electronic subsystem and transmitting indications of the changes to a processor when used in a sensing mode and for receiving a signal from a processor and transmitting the signal to a subsystem when used in a control mode, the environment/sensing circuit comprising:
  a. an interrupt memory, dedicated to an environmental condition in which changes are to be detected, for storing a flag indicative of detected changes in the environmental condition, the contents of the interrupt memory being accessible to the processor;
  b. a programmable inverter for inverting the signal prior to transmission of the signal to the subsystem;
  c. a reference memory for storing a reference state, the reference state being programmed by the processor;
  b. a difference detector for creating an exception signal when a difference exists between the contents of the reference memory and the environmental condition; and
  c. a programmable switch for preventing the difference detector from making a created exception signal accessible to the processor and from storing the created exception signal in the interrupt memory.

16. The environment sensing/control circuit of claim 15, further comprising an interrupt disable memory means for storing a signal determinative of whether the programmable switch means will prevent the difference detecting means from making accessible to the processor, a created exception signal and from storing the exception signal in the interrupt memory means.

17. The environment sensing/control circuit of claim 16, further comprising an output buffer means coupled to the output of the interrupt disable memory means for providing access to the contents of the interrupt disable memory means by the processor while electrically isolating the output of the interrupt disable memory means from the processor to prevent disturbances or overloading from occurring on the output of the interrupt disable memory means.

18. An environment sensing/control circuit for detecting changes in the environment of an electronic subsystem and transmitting indications of the changes to a processor when used in a sensing mode and for receiving a signal from a processor and transmitting the signal to a subsystem when used in a control mode, the environment/sensing circuit comprising:
  a. an interrupt memory, dedicated to an environmental condition in which changes are to be detected, for storing a flag indicative of detected changes in the environmental condition, the contents of the interrupt memory being accessible to the processor;
  b. a programmable invertor for inverting the signal prior to transmission of the signal to the subsystem;
  c. a reference memory for storing a reference state, the reference state being programmed by the processor;
  d. a difference detector for creating an exception signal when a difference exists between the contents of the reference memory and the environmental condition; and
  e. summing means for creating an interrupt signal, the interrupt signal indicating that any one or more of a plurality of environmental conditions has changed;
wherein the output of the summing means is applied to the interrupt memory for determining when the interrupt memory is to store the exception signal created by the difference detecting means.

19. An environment sensing/control circuit for detecting changes in the environment of an electronic subsystem and transmitting indications of the changes to a processor when used in a sensing mode and for receiving a signal from a processor and transmitting the signal to a subsystem when used in a control mode, the environment/sensing circuit comprising:
  a. an interrupt memory, dedicated to an environmental condition in which changes are to be detected, for storing a flag indicative of detected changes in the environmental condition, the contents of the interrupt memory being accessible to the processor;
  b. a programmable inverter for inverting the signal prior to transmission of the signal to the subsystem; and
  c. a programmable switch for preventing access to the processor of the detected changes in the environmental condition when the access has not been initiated by the processor, and for preventing storage of the detected changes in the interrupt memory.

20. The environment sensing/control circuit of claim 19, further comprising an interrupt disable memory means for storing a signal determinative of whether the programmable switching means will prevent uninitiated access to the processor of the detected changes in the environmental condition and storing of the detected changes in the interrupt memory means.

21. The environment sensing/control circuit of claim 20, further comprising an output buffer means coupled to the output of the interrupt disable memory means for providing access to the contents of the interrupt disable memory means by the processor while electrically isolating the output of the interrupt disable memory means from the processor to prevent disturbances or overloading from occurring on the output of the interrupt disable memory means.

22. An environment sensing/control circuit for detecting changes in the environment of an electronic subsystem and transmitting indications of the changes to a processor when used in a sensing mode and for receiving a signal from a processor and transmitting the signal to a subsystem when used in a control mode, the environment/sensing circuit comprising:

a. an interrupt memory, dedicated to an environmental condition in which changes are to be detected, for storing a flag indicative of detected changes in the environmental condition, the contents of the interrupt memory being accessible to the processor;

b. a first programmable inverter for inverting the signal prior to transmission of the signal to the subsystem; and c. a second programmable inverter for selectively inverting the signal representing the environmental condition, the second programmable inverter being coupled to an environmental condition input connection of the environment sensing/control circuit.

23. The environment sensing/control circuit of claim 22, further comprising an input polarity memory means for storing a signal which is determinative of whether the programmable inversion means will invert the signal representing the environmental condition, the input polarity memory means being coupled to an input of the programmable inversion means.

24. The environment sensing/control circuit of claim 23, further comprising an output buffer means coupled to the output of the input polarity memory means for providing access to the contents of the input polarity memory means by the processor while electrically isolating the output of the input polarity memory means from the processor to prevent disturbances or over-loading from occurring on the output of the input polarity memory means.

25. A two-mode environment sensing/control system for detecting changes in the environment of an electronic subsystem and transmitting indications of the changes to a processor when used in a sensing mode and for receiving a signal from a processor and storing the signal in the electronic subsystem, the environment sensing/control system comprising:

a. an environment sensing/control circuit for detecting changes in the environment of the electronic subsystem and transmitting indications of the changes to a processor when used in the sensing mode and for receiving a signal from the processor and transmitting the signal to a subsystem when used in a control mode, the environment sensing/control circuit comprising:

(1) a single electrical connection means for electrically interfacing the environment sensing/control circuit to a subsystem and conducting a condition signal from the subsystem to the environment sensing/control circuit when the environment sensing/control circuit is used in the sense mode and for conducting a control signal from the environment sensing/control circuit to the subsystem when the environment sensing/control circuit is used in a control mode;

(2) an output buffer means coupled to the single electrical connection for selectively increasing and decreasing the output impedance at the single electrical connection;

(3) an interrupt memory means, dedicated to an environmental condition in which changes are to be detected, for storing detected changes in the environmental condition, the contents of the interrupt memory means being accessible to the processor;

(4) a programmable inversion means for inverting the signal prior to transmission of the signal to the subsystem; and b. an electronic subsystem coupled to the environment sensing/control circuit via the single electrical connection means for storing the signal received by the environment sensing/control circuit and for transmitting environmental condition signals to the environment sensing/control circuit, the electronic subsystem comprising:

(1) input memory means for storing the environmental condition signals; and (2) tri-statable drivers coupled to the outputs of the subsystem for selectively increasing and decreasing the output impedance at subsystem outputs.

26. The environment sensing/control system of claim 25, wherein the environment sensing/control circuit further comprising an output buffer means coupled to the output of the interrupt memory means for providing access to the contents of the interrupt memory means by the processor while electrically isolating the output of the interrupt memory means from the processor to prevent disturbances or overloading from occurring on the output of the interrupt memory means.

27. The environment sensing/control system of claim 25, wherein the environment sensing/control circuit further comprises:

a. a reference memory means for storing a reference state, the reference state being programmed by the processor; and b. a difference detecting means for creating an exception signal when a difference exists between the contents of the reference memory means and the environmental condition;

wherein the exception signal created by the difference detecting means is stored in the interrupt memory means.

28. The environment sensing/control system of claim 27, wherein the environment sensing/control circuit further comprises an output buffer means coupled to output of the reference memory means for providing access to the contents of the reference memory means by the processor while electrically isolating the output of the reference memory means from the processor to prevent disturbances or overloading from occurring on the output of the reference memory means.

29. The environment sensing/control system of claim 27, wherein the environment sensing/control circuit further comprises a programmable switching means for preventing the difference detecting means from making accessible to the processor, a created exception signal and from storing the created exception signal in the interrupt memory means.

30. The environment sensing/control system of claim 29, wherein the environment sensing/control circuit further comprises an interrupt disable memory means for storing a signal determinative of whether the programmable switch means will prevent the difference detecting means from making accessible to the processor, a created exception signal and from storing the exception signal in the interrupt memory means.

31. The environment sensing/control system of claim 30, wherein the environment sensing/control circuit further comprises an output buffer means coupled to the output of the interrupt disable memory means for providing access to the contents of the interrupt disable memory means by the processor while electrically isolating the output of the interrupt disable memory means from the processor to prevent disturbances or overloading from occurring on the output of the interrupt disable memory means.

32. The environment sensing/control system of claim 25, wherein the environment sensing/control circuit further comprises a summing means for creating an interrupt signal, the interrupt signal indicating that any one or more of a plurality of environmental conditions has changed.

33. The environment sensing/control system of claim 32, wherein the output of the summing means is applied to the interrupt memory means for determining when the interrupt memory means is to store the exception signal created by the difference detecting means.

34. The environment sensing/control system of claim 25, wherein the environment sensing/control circuit further comprises a programmable inversion means for selectively inverting the signal representing the environmental condition, the programmable inversion means being coupled to the environmental condition input connection of the environment sensing/control circuit.

35. The environment sensing/control system of claim 34, wherein the environment sensing/control circuit further comprises an input polarity memory means for storing a signal which is determinative of whether the programmable inversion means will invert the signal representing the environmental condition, the input polarity memory means being coupled to the input of the programmable inversion means.

36. The environment sensing/control system of claim 35, wherein the environment sensing/control circuit further comprises an output buffer means coupled to the output of the input polarity memory means for providing access to the contents of the input polarity memory means by the processor while electrically isolating the output of the input polarity memory means from the processor to prevent disturbances or overloading from occurring on the output of the input polarity memory means.

* * * * *